United States Patent [19]

Bernett

[11] Patent Number: 4,508,144
[45] Date of Patent: Apr. 2, 1985

[54] FLOW CONTROL DEVICE

[75] Inventor: Thomas B. Bernett, Arlington Heights, Ill.

[73] Assignee: Eaton Corporation, Cleveland, Ohio

[21] Appl. No.: 555,853

[22] Filed: Nov. 28, 1983

[51] Int. Cl.³ .............................................. F15D 1/02
[52] U.S. Cl. .................................................... 138/45
[58] Field of Search ........................ 138/41, 43, 45, 46

[56] References Cited
U.S. PATENT DOCUMENTS

| 2,936,790 | 5/1960 | Dahl et al. | 138/46 |
| 3,006,378 | 10/1961 | Erickson et al. | 138/46 |
| 3,474,831 | 10/1969 | Noakes | 138/46 X |

Primary Examiner—Stephen Marcus
Assistant Examiner—Mark Thronson
Attorney, Agent, or Firm—C. H. Grace; A. E. Chrow

[57] ABSTRACT

Disclosed is a resilient fatigue resistant flow control device (140) for maintaining a substantially constant rate of fluid flow through a passageway (64) under varying fluid pressure differentials across the device. The device comprises at least one metering orifice (72) extending between the upstream and downstream sides within a defined region (R) that is circumscribed on the downstream side by a peripheral surface (78) that is adapted to rest directly against a seat (68) in the passageway. A plurality of spaced-apart bypass channels (84) extend through the device between the upstream side and the downstream peripheral surface that are positioned so that at least a portion of each channel intersects region (R) adjacent the peripheral surface so that the compression and expansion of region R adjacent the peripheral surface is able to control the amount of fluid flowing through the channels.

11 Claims, 10 Drawing Figures

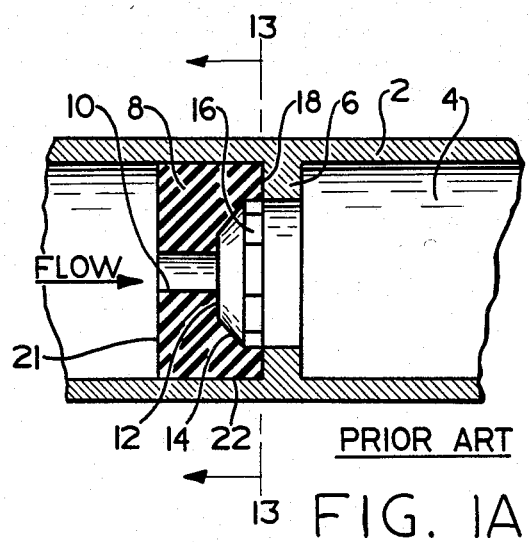
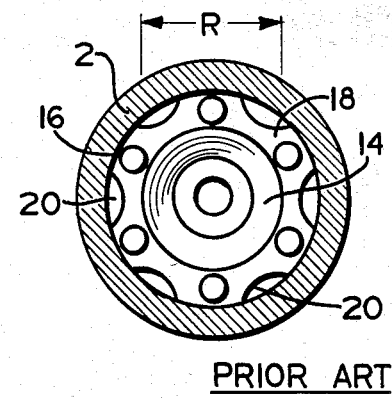
FIG. 1A PRIOR ART
FIG. 1B PRIOR ART
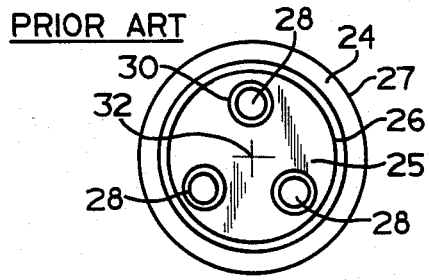
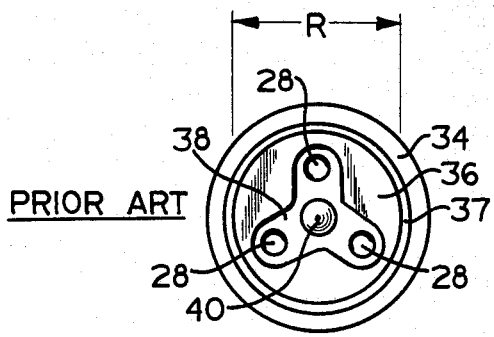
FIG. 2A PRIOR ART
FIG. 2B PRIOR ART
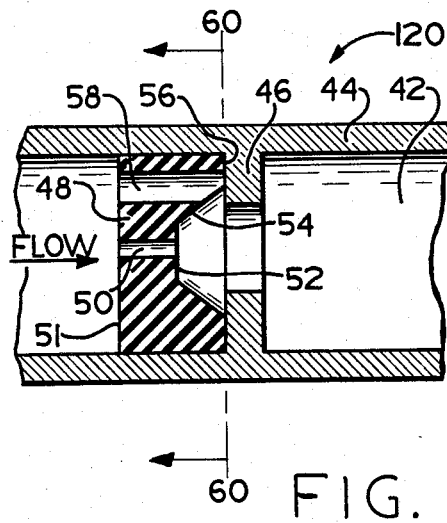
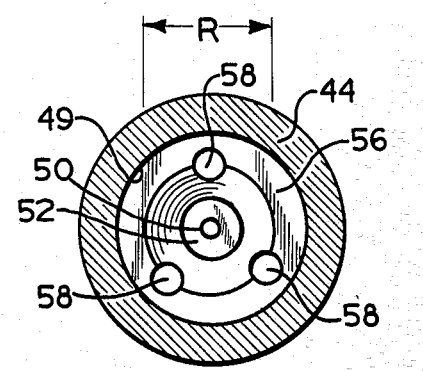
FIG. 3A
FIG. 3B

FLOW CONTROL DEVICE

INTRODUCTION

This invention relates generally to a device utilizing a resilient compressible member having a constrictable orifice for maintaining a substantially constant rate of fluid flow through a passageway under varying fluid pressure differentials across the member and more particularly to such device in which the compressible member is provided with bypass channels for minimizing flutter under varying fluid pressure differentials across the member that are positioned to provide the member with improved resistance to fatigue failure heretofore commonly associated with such members.

BACKGROUND OF THE INVENTION

The use of a flow control device utilizing a resilient compressible member preferably shaped in the form of a disc or the like having at least one orifice therethrough that is able to constrict and expand in response to compression and relaxation of the member against a seat in a passageway in response to respective increases and decreases in the fluid pressure differential across the member to maintain a substantially constant rate of fluid flow through the passageway are well known in the art.

One of the problems heretofore associated with such flow control devices has been noise and flutter associated with oscillation of the resilient member under varying fluid pressure differentials across the member particularly where high fluid pressure differentials are involved. As a means of increasing flow at low pressure, it has been common practice in the past to include pads interspersed by bypass channels about the periphery of the downstream side of the resilient member through and around which the fluid is able to flow at least at lower fluid pressure differentials across the member but which can be controlled to the point where they become sealed by compression of the pads against the seat as higher fluid pressure differentials are imposed across the member.

An example of such a flow control device in which the compressible member features a combination of a single orifice and a symmetrical array of bypass channels about its periphery is disclosed in U.S. Pat. No. 2,936,790, the disclosure of which is incorporated herein by reference. The device, however, utilizes a symmetrical arrangement of resilient pads that are adapted to engage the seat and establish a predetermined spaced relationship therefrom at a desired fluid pressure differential across the member so that the fluid can flow through the bypass channels and inwardly across the seat and into the downstream side of the passageway until the fluid pressure differential across the member is increased to a point at which the pads become compressed sufficiently to enable the surface of the compressible member from which they extend to press against the seat and seal the flow. These pads increase the all-over dimensions of the flow control member resulting in larger space requirements for their application.

An example of a fluid flow control device utilizing a resilient compressible member having a plurality of orifices to reduce noise that are able to constrict and expand to maintain a substantially constant rate of fluid flow through a passageway but which does not have pads or bypass channels is disclosed in U.S. Pat. No. 3,006,378, the disclosure of which is incorporated herein by reference. Although such compressible member may be used to advantage in controlling flow rate of the fluid, the absence of bypass flow channels results in low flow at low pressures.

Consequently, the prior art fluid control devices utilizing bypass channels in combination with pads on their downstream side have resulted in an increase of resiliency of the flow control member which under certain conditions of flow and pressure will cause flutter or rapid oscillation of the center part of the fluid control member causing fatigue failure leading to their ultimate break up.

In view of the above, a need exists to provide a fatigue resistant flow control device utilizing a resilient compressible member having at least one orifice therethrough that is able to contract and expand upon compression and relaxation of the member against a seat in a passageway to maintain a substantially constant rate of flow through the passageway in response to respective increases and decreases in the fluid pressure differential across the member in addition to having fluid bypass channels as a means of increasing flow at lower fluid pressures.

SUMMARY OF THE INVENTION

Accordingly, it is an object of the invention to provide a fatigue resistant fluid control device utilizing a resilient compressible member having at least one orifice therethrough adapted to maintain a substantially constant rate of fluid flow through a passageway under varying fluid pressure differentials across the member and having a plurality of bypass channels therethrough for increasing the fluid flow through the passageway at lower fluid pressures.

It is another object of this invention to provide an improved flow control device for maintaining a substantially constant rate of fluid flow through a passageway under varying fluid pressure conditions that utilizes a resilient compressible member having at least one orifice therethrough adapted to maintain a substantially constant rate of fluid flow through the passageway and having a plurality of bypass channels adapted to increase flow through the passageway at lower fluid pressures and positioned to provide the device with improved resistance to fatigue failure by enabling the removal of pads heretofore associated with such devices in the past.

DESCRIPTION OF THE DRAWINGS

FIGS. 1A and 1B respectively show a side elevation cross-sectional view and an upstream view of a prior art device of the type referred to herein for controlling fluid flow through a passageway;

FIGS. 2A and 2B respectively show a downstream view and an upstream view of the resilient compressible member of another type of prior art device used to control fluid flow rate through a passageway;

FIGS. 3A and 3B respectively show a side elevation cross-sectional view and an upstream view of an embodiment of the flow control device of the invention;

PRIOR ART

Figure 4A:
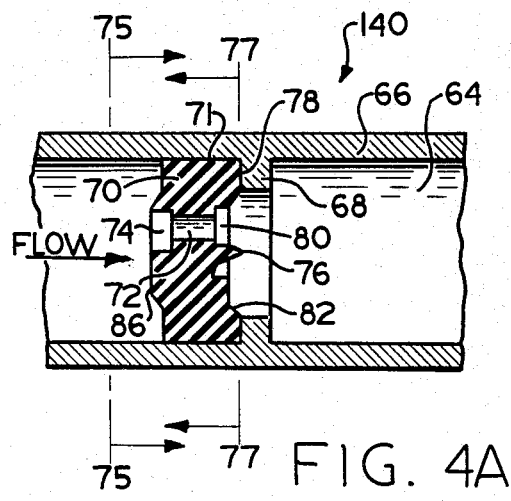
FIGS. 4A, 4B and 4C respectively show a side elevation cross-sectional view and a downstream and upstream view of another embodiment of the flow control device of the invention.

FIG. 1A shows a prior art device of the type disclosed in U.S. Pat. No. 2,936,790 for maintaining flow rate of a fluid through a passageway 4 in housing 2. The device comprises a resilient compressible member 8 and a seat 6 in passageway 4. An upstream view 13—13 of member 8 is shown in FIG. 1B. Although passageway 4 and member 8 commonly have a cylindrical shape and seat 5 commonly has a generally annular shape, it is to be understood that any shape combination of passageway 4, seat 6 and member 8 that is able to maintain a substantially constant rate of fluid flow through the passageway under varying fluid pressure in the manner described herein is considered to be within the scope of the invention.

Member 8 is commonly made from a resilient material such as a suitable rubber that is suitably resistant to the temperature and type of fluid whose flow rate is being controlled and possesses the degree of resilience to expand and contract against the seat in the amount desired in response to variations in the fluid pressure differential across the member encountered for the particular application.

Member 8 has a single orifice 10 therethrough through which the fluid is able to flow in the direction indicated and which is able to constrict and expand to provide a substantially constant rate of fluid flow through the passageway in response to the compression and expansion of member 8 against seat 6 arising from respective increases and decreases in the fluid pressure differential across member 8.

Member 8 has an intermediate surface "R" within peripheral surface 18 comprising recessed surface 12 that surrounds orifice 10 and faces toward the downstream direction. Surface 12 is surrounded by surface 14 which extends in the upstream direction to connect surface 12 and peripheral surface 18.

A substantially symmetrical array of spaced-apart resilient pads 16 extend from surface 18 in the downstream direction. Member 8 has an upstream side 21 and a downstream side ending in pads 16 that are circumscribed and connected together by outer wall 22.

As shown in FIG. 1B, member 8 has a plurality of bypass channels 20 disposed in a substantially symmetrical spaced-apart array about orifice 10 and extend between side 21 and peripheral surface 18 of member 8 but do not intersect surface 14. Pads 16 are positioned to engage seat 6 when member 8 is received into passageway 4 and dimensioned such that the fluid is able to flow through bypass channels 20 and inwardly across seat 6 into the downstream side of passageway in the amount desired for a prescribed fluid pressure differential across member 8 and controlled by the movement of peripheral surface 18 towards and away from seat 6 in response to the respective compression and expansion of pads 16 against seat 4 in response to increases and decreases in the fluid pressure differential across member 4.

FIGS. 2A and 2B respectively show an upstream view and a downstream view of a prior art resilient member similar to the type disclosed in U.S. Pat. No. 3,006,378. In FIG. 2A, the resilient member has an upstream side 24 circumscribed by outer wall 27 from which raised surface 25 extends in the upstream direction by means of tapered surface 26. Surface 25 is substantially coaxially aligned with intermediate region "R" on the downstream side of the member shown in FIG. 2B about longitudinal axis 32. A plurality of flow control orifices 28 are disposed through the member in a substantially symmetrical spaced-apart array between surface 25 and intermediate Region "R" shown in FIG. 2B.

Region "R" on the downstream side of the member shown in FIG. 2B comprises tapered surface 37 which tapers inwardly away from the viewer in the upstream direction to recessed surface 36 which faces in the downstream direction. Orifices 28 exit the member within interconnecting trough 38 disposed in surface 36. A protuberance in the form of cone 40 projects towards the viewer from the bottom of trough 38 and orifices 28 are disposed in a substantially symmetrical array about cone 40. The use of a protuberance such as cone 40 as a silencer by inhibiting the ability of the three streams exiting orifices 28 from colliding immediately after exiting the member is well known in the art. Trough 38 is adapted to direct each stream of fluid exiting from orifices 28 towards cone 40. It is to be noted, however, that the prior art resilient flow control member shown in FIGS. 2A and 2B does not utilize bypass channels previously described with respect to FIGS. 1A and 1B.

DESCRIPTION OF PREFERRED EMBODIMENTS

An embodiment of the invention in the form of device 120 is shown in FIGS. 3A and 3B. Device 120 comprises a resilient compressible member 48 having an outer wall 49 that is dimensionally adapted to enable member 48 to be removeably received within passageway 42 of housing 44 with its downstream side peripheral surface 56 directly engaging seat 46. Member 48 has a single flow control orifice 50 extending therethrough between upstream side 51 and intermediate Region "R" on the downstream side shown in view 60—60 of FIG. 3B. Region "R" comprises tapered surface 54 which tapers from substantially flat surrounding surface 56 inwardly in the upstream direction to intersect surface 52 which surrounds orifice 50 and faces in the upstream direction.

Member 48 has a plurality of bypass channels 58 extending therethrough disposed in a substantially symmetrical spaced-apart array about orifice 50.

Unlike the prior art members heretofore described, bypass channels 58 are positioned so that at least a portion thereof intersect Region "R" adjacent surface 56 to the extent necessary to enable the compression and expansion of Region "R" adjacent surface 56 to control the flow of the fluid through channels 58 in response to respective increases and decreases of the fluid pressure differential imposed across member 48. Region "R" comprises a tapered surface 54 that tapers in the upstream direction inwardly away from the viewer in FIG. 3B to intersect surface 52 which surrounds orifice 50 and faces towards the viewer in a downstream direction. The positioning of channels 58 in the manner described enables removal of the previously described prior art pads from surface 56 so that it can rest directly upon seat 46 and thereby eliminates the fatigue failure and eventual disintegration under repeated compression and expansion due to respective increases and decreases in the fluid pressure differential across member 48.

Figure 4B:
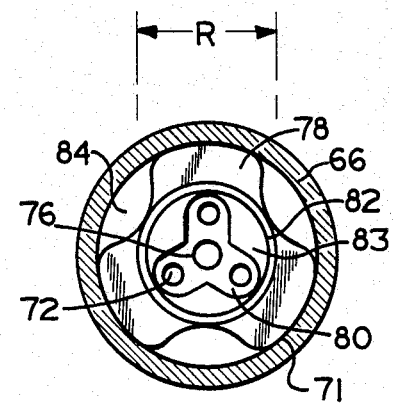
Figure 4C:
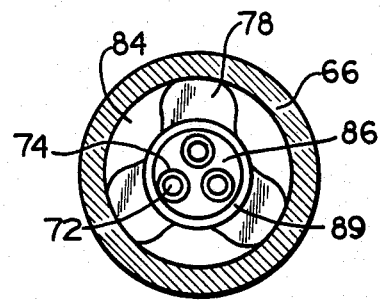

Another embodiment of the invention is in the form of device 140 shown in FIGS. 4A, 4B and 4C. Device 140 comprises a resilient compressible member 70 having an outer wall 71 that is dimensionally adapted to enable member 70 to be removeably received within passageway 64 in housing 66 with its downstream side peripheral surface 78 resting directly against seat 68.

As shown in the downstream side 77—77 view of FIG. 4B, member 70 has a plurality of flow control orifices 72 that extend through member 70 between the upstream and downstream sides within Region "R" in a substantially symmetrical spaced-apart array about previously decribed silencing cone 76 that projects in the downstream direction away from the bottom of previously described troughs 80. Region "R" includes surface 82 that tapers from surface 78 inwardly away from the viewer in the upstream direction and intersects recessed surface 83 that faces in the downstream direction and contains troughs 80.

The upstream side of member 70 shown in view 75—75 of FIG. 4C shows that the upstream side of member 70 has a surface 89 that tapers outwardly toward the viewer in an upstream direction to raised surface 86 that faces in the upstream direction. Counterbores 74 are disposed in the upstream side of orifice 72 to enhance the flow of the fluid therethrough. As shown in FIG. 4C, member 70 has three bypass channels 84 disposed in a substantially symmetrical spaced-apart array about orifices 72. Channels 84 intersect surface 89 of member 70 and are open sided and extend along the length of member 70 between the upstream and downstream sides thereof.

Figure 5:
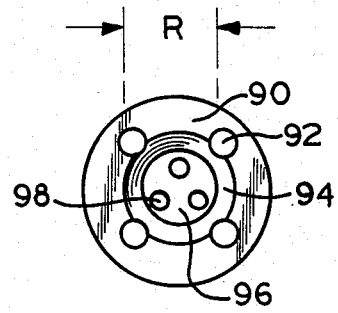
FIG. 5 shows an upstream view of another embodiment of the resilient compressible member of the flow control device of the invention.

Another embodiment of a resilient member made in accordance with the invention is shown in FIG. 5. FIG. 5 is a view of the downstream side of the member having an intermediate Region "R" surrounded by peripheral surface 90 that faces towards the viewer in the downstream direction. The member has a plurality of flow control orifices 98 extending through the member between the upstream and downstream sides within Region "R". Region "R" includes a tapered surface 94 that extends inwardly in an upstream direction away from the viewer to intersect surface 96 that surrounds orifices 98 and faces towards the viewer in a downstream direction. The member has a plurality of bypass channels 92 extending between the upstream and downstream sides of the member and are disposed in a substantially symmetrical spaced-apart array about orifices 98. Channels 92 are positioned so that at least a portion of each intersects the Region "R" adjacent surface 90 to the extent necessary to enable the compression and expansion of Region "R" adjacent surface 90 to control the flow of fluid through channels 90 in response to respective increases and decreases in the fluid pressure differential imposed across the member.

An example of typical dimensioning of cylindrically shaped compressible members of the type described herein is where the outer diameter of about ¾ inch or less, the overall length between the upstream and downstream sides is in the order of about ¼ inch, and the diameter of the flow control orifice and close-sided bypass channels is in the order of about ⅛ inch or less.

Examples of applications in which the flow control device of the invention may be used to advantage include controlling water flow rates in appliances at rates of from about 0.03 gpm to about 30 gpm at upstream fluid pressure typically ranging from about 5 psi to about 175 psi and in controlling flow rate of vehicular anti-freeze as well as various beverage dispensing applications. Depending upon the particular application, suitable resilient forms of buna N, nitrile, ethylene-propylene, silicone, and viton rubber can be used to advantage in making the flow control device of the invention.

Although it is preferred that the flow control orifices and/or bypass channels be symmetrically arranged in the case where there is more than one, it is to be understood that embodiments of the flow control device of the invention that feature assymmetrical arrangement of the orifices and/or bypass channels that are able to provide a substantially constant rate of fluid flow therethrough in the manner described herein are considered within the scope of the invention. It is also to be understood that embodiments of the flow control device of the invention in which the resilient compressible member features in part or in whole a recessed upstream side surface and a portion or the whole of a region "R" of the downstream side of the member that extends further in the downstream direction than the peripheral surrounding surface adapted to engage the seat is also included within the scope of the invention.

What is claimed is:

1. A flow control device for providing a substantially constant rate of fluid flow under varying pressure through a passageway in a housing, said device comprising a resilient member having spaced-apart upstream and downstream sides and dimensionally adapted to enable the member to be removably received within the housing with said downstream side having an intermediate region surrounded by a substantially flat peripheral surface facing in the downstream direction that is adapted to engage a seat in the passageway directly while assuring that the intermediate region remains in fluid communication with the downstream side of the passageway, said member having at least one flow control orifice extending therethrough between the upstream side and the downstream side within the intermediate region, said member having a plurality of bypass channels extending therethrough between the upstream side and downstream peripheral surface in the direction of fluid flow through the passageway in the housing, said plurality of bypass channels being in a spaced-apart array about the orifice, said orifice adapted to constrict and relax to maintain a substantially constant rate of fluid flow therethrough in response to compression and relaxation of the member against the seat in response to respective increases and decreases in the fluid pressure differential across the member, and said member having reduced tendency to flutter and improved resistance to fatigue failure arising from the repeated relaxation and compression thereof under varying fluid pressure differentials across the member as a result of said channels being positioned so that at least a portion of each intersects the intermediate region, the peripheral surface, and an intersection between the intermediate region and the peripheral surface to the extent necessary to enable compression and relaxation of the intermediate region adjacent the peripheral surface to control the flow of the fluid through the channels in response to respective increases and decreases in the fluid pressure differential across the member.

2. The device of claim 1 wherein the intermediate region includes a tapered surface adjacent the peripheral surface that extends in the upstream direction between the orifice and the peripheral surface.

3. The device of claim 2 including an annular surface disposed between the orifice and the tapered surface of the resilient member that surrounds the orifice and faces in the downstream direction.

4. The device of claim 1 wherein the seat and the resilient member peripheral surface have a substantially annular shape.

5. The device of claim 1 wherein said resilient member has a raised surface that extends in the upstream direction within the outer wall from the upstream side thereof and is substantially axially aligned with the downstream side intermediate region and the orifice extends through the member between the raised surface and the downstream side intermediate region.

6. The device of claim 1 having a plurality of the orifices positioned in a spaced-apart substantially symmetrical array within the downstream intermediate region of the member.

7. The device of claim 6 including a protuberance that extends in the downstream direction from the downstream intermediate region of the member and about which the orifices are positioned and upon which the fluid exiting from each of the orifices is able to impinge to lessen turbulence arising from impact of converging streams fluid flowing from said orifices.

8. The device of claim 6 wherein each of the orifices is disposed within a trough in the downstream side intermediate region that extends between each said orifice and the protuberance and is adapted to enhance the flow of the fluid from the orifice toward the protuberance.

9. The device of claim 7 wherein the protuberance has a generally conical shape.

10. The device of claim 1 wherein the seat and the downstream side peripheral surface have a substantially annular shape.

11. The device of claim 1 including a counterbore in the upstream side of the member that is substantially coaxially aligned with each of the orifices and dimensionally adapted to enhance the flow of the fluid therethrough.

* * * * *